United States Patent
Wang

(10) Patent No.: US 9,164,926 B2
(45) Date of Patent: Oct. 20, 2015

(54) SECURITY CONTROL METHOD OF NETWORK STORAGE

(71) Applicant: Donglin Wang, Beijing (CN)

(72) Inventor: Donglin Wang, Beijing (CN)

(73) Assignee: Tianjin Sursen Investment Co., Ltd., Tianjin (CN)

( * ) Notice: Subject to any disclaimer, the term of this patent is extended or adjusted under 35 U.S.C. 154(b) by 33 days.

(21) Appl. No.: 14/088,297

(22) Filed: Nov. 22, 2013

(65) Prior Publication Data

US 2014/0143548 A1 May 22, 2014

Related U.S. Application Data

(63) Continuation-in-part of application No. 14/079,585, filed on Nov. 13, 2013.

(60) Provisional application No. 61/729,341, filed on Nov. 22, 2012.

(51) Int. Cl.
H04L 9/32 (2006.01)
G06F 12/14 (2006.01)
H04L 9/08 (2006.01)

(52) U.S. Cl.
CPC .......... G06F 12/1408 (2013.01); H04L 9/0822 (2013.01); H04L 9/0825 (2013.01); H04L 9/0897 (2013.01); H04L 9/3236 (2013.01)

(58) Field of Classification Search
CPC . G06F 12/1408; H04L 9/0822; H04L 9/0825; H04L 9/0897; H04L 9/30; H04L 9/3236

USPC .................................................. 713/161, 171
See application file for complete search history.

(56) References Cited

U.S. PATENT DOCUMENTS

| 8,199,911 | B1 | 6/2012 | Tsaur et al. |
| 8,812,442 | B1 | 8/2014 | Panchbudhe et al. |
| 2007/0269041 | A1* | 11/2007 | Bhatnagar et al. ............... 380/30 |
| 2008/0123850 | A1* | 5/2008 | Bhatnagar et al. ............. 380/259 |
| 2008/0235521 | A1 | 9/2008 | Gosselin et al. |
| 2012/0204024 | A1 | 8/2012 | Augenstein et al. |
| 2013/0198513 | A1* | 8/2013 | Kim .............................. 713/168 |
| 2013/0246790 | A1 | 9/2013 | Wang |
| 2013/0246811 | A1 | 9/2013 | Wang |

FOREIGN PATENT DOCUMENTS

| CN | 1832398 A | 9/2006 |
| CN | 101989984 A | 3/2011 |
| WO | WO 2013/139079 A1 | 9/2013 |

* cited by examiner

Primary Examiner — Samson Lemma
(74) Attorney, Agent, or Firm — Duane Morris LLP; David T. Xue

(57) ABSTRACT

The present invention discloses a security control method of network storage to ensure that the unencrypted data cannot be figured out from all information stored on the server. The method includes: encrypting, the private key of a user using a user credential and storing the encrypted private key in a server; encrypting data using a storage key, when uploading the data to the server, encrypting the decryption key corresponding to the storage key using the public key of the user, and submitting the encrypted data and the encrypted decryption key to the server.

17 Claims, 5 Drawing Sheets

SECURITY CONTROL METHOD OF NETWORK STORAGE

CROSS-REFERENCE TO RELATED APPLICATION

The application is a continuation in part of provisional application 61/729,341 (filed on Nov. 22, 2012); and is also a CIP of U.S. patent application Ser. No. 14/079,585 (filed on Nov. 13, 2013), the contents of which are incorporated herein by reference.

FIELD OF THE INVENTION

The present invention relates to storage technology, and particularly, to a security control method of network storage.

BACKGROUND OF THE INVENTION

Cloud storage (includes public cloud and private cloud) has been more and more of a trend. Cloud storage indicates a system that collects massive amounts of different storage devices on the Internet and makes them work together by using application software with functions such as cluster application, grid technology, or distributed file systems, for the purpose of offering data storage and business access services.

A new technology is needed to ensure that the unencrypted data cannot be figured out from all information stored on the server; so that unencrypted data cannot be accessed by other users even cloud storage service providers.

DETAILED DESCRIPTION OF THE INVENTION

The embodiments of the present invention are described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as systems, methods or devices. The following detailed description should not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on". The term "coupled" implies that the elements may be directly connected together or may be coupled through one or more intervening elements. Further reference may be made to an embodiment where a component is implemented and multiple like or identical components are implemented.

While the embodiments make reference to certain events this is not intended to be a limitation of the embodiments of the present invention and such is equally applicable to any event where goods or services are offered to a consumer.

Further, the order of the steps in the present embodiment is exemplary and is not intended to be a limitation on the embodiments of the present invention. It is contemplated that the present invention includes the process being practiced in other orders and/or with intermediary steps and/or processes.

The present invention is further described in detail hereinafter with reference to the accompanying drawings as well as embodiments so as to make the objective, technical scheme and merits thereof more apparent.

Figure 1:
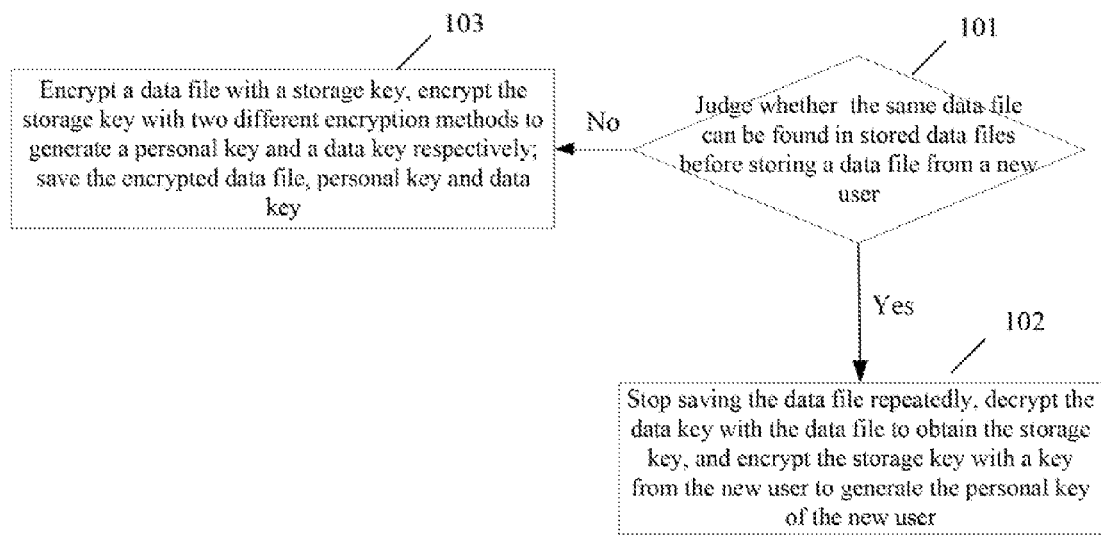
FIG. 1 is a flow chart of a storage method provided in the embodiment of the present invention.

FIG. 1 is a flow chart of a storage method provided in the embodiment of the present invention. In this embodiment, data is stored after being encrypted with a storage key; and the storage key is further encrypted with two different encryption methods to generate a personal key and a data key respectively, wherein the personal key can be decrypted by a key of a user who owns the data to obtain the storage key and the data key can be decrypted by the unencrypted data to obtain the storage key; finally, the encrypted data, personal key and data key are saved. The method detailed comprises:

Step 101: before storing a data from a user, judge whether any of stored data is same with the data to be uploaded; if yes, execute Step 102; otherwise execute Step 103;

Step 102: Do not upload and save another copy of the data from the user, decrypt the data key of the same data with the unencrypted data to be uploaded to obtain the storage key, and encrypt the storage key with a key of the user to generate the personal key of the user; save the personal key of the user, and then terminate the process.

Step 103: encrypt the data with a storage key, encrypt the storage key with two different encryption methods to generate a personal key and a data key respectively, and the methods are same as disclosed above; save the encrypted data, personal key and data key; then terminate the process.

When accessing the data in the future, the user uses his/her own key to decrypt the personal key and obtain the storage key, and then obtain the unencrypted contents of the data by using the storage key. In this way, storing duplicate data in the server can be prevented and also the storage service provider itself (its staff) is unable to access the unencrypted content of the data.

In another embodiment of the present invention, the server judges duplicate data based on the HASH values of the data using a predefined HASH algorithm, for example, two files will be regarded as the duplicate of each other if the two files have the same HASH values. Therefore the HASH values of all data will be saved in the server side and the HASH value of data to be stored will be calculated before the file is stored so that the server can judge whether a duplicate of the data already exists. Obviously those skilled in the art may use other methods to judge whether files are duplicates and the present invention does not limit the judgment method.

In another embodiment of the present invention, there is a client on the user side; when the server side judges that there already exists duplicate data in the server, the data key of the data on the server will be sent to the client side; the client side decrypts the data key received with the unencrypted data at its own side to obtain the storage key; the client side also uses a key of the user to encrypt the storage key to generate the personal key of the user and sends the personal key of the new user to the server for storage.

Figure 2:
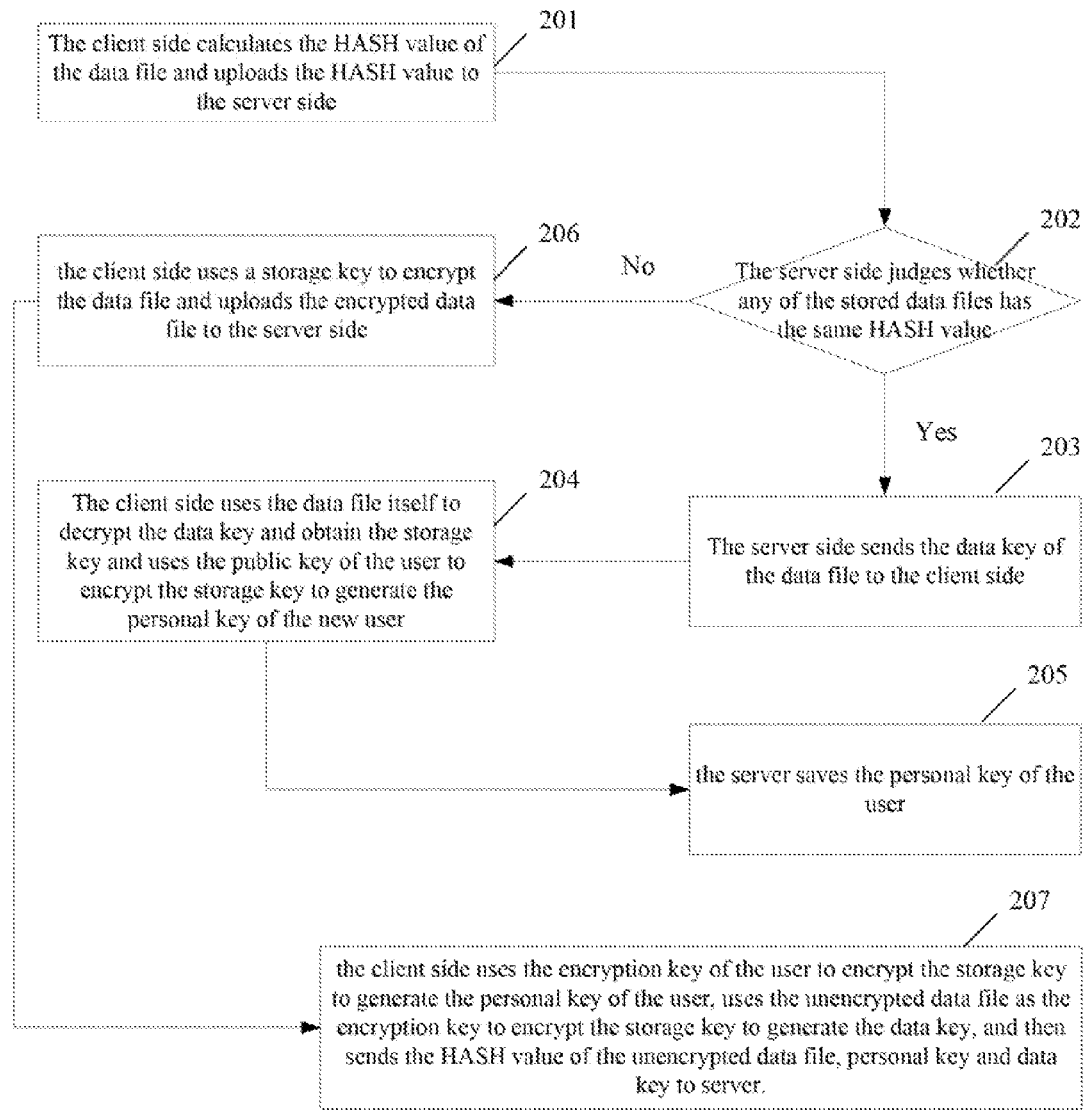
FIG. 2 is another flow chart of a storage method provided in the embodiment of the present invention.

FIG. 2 shows a practical example of the embodiment.

Figure 3:
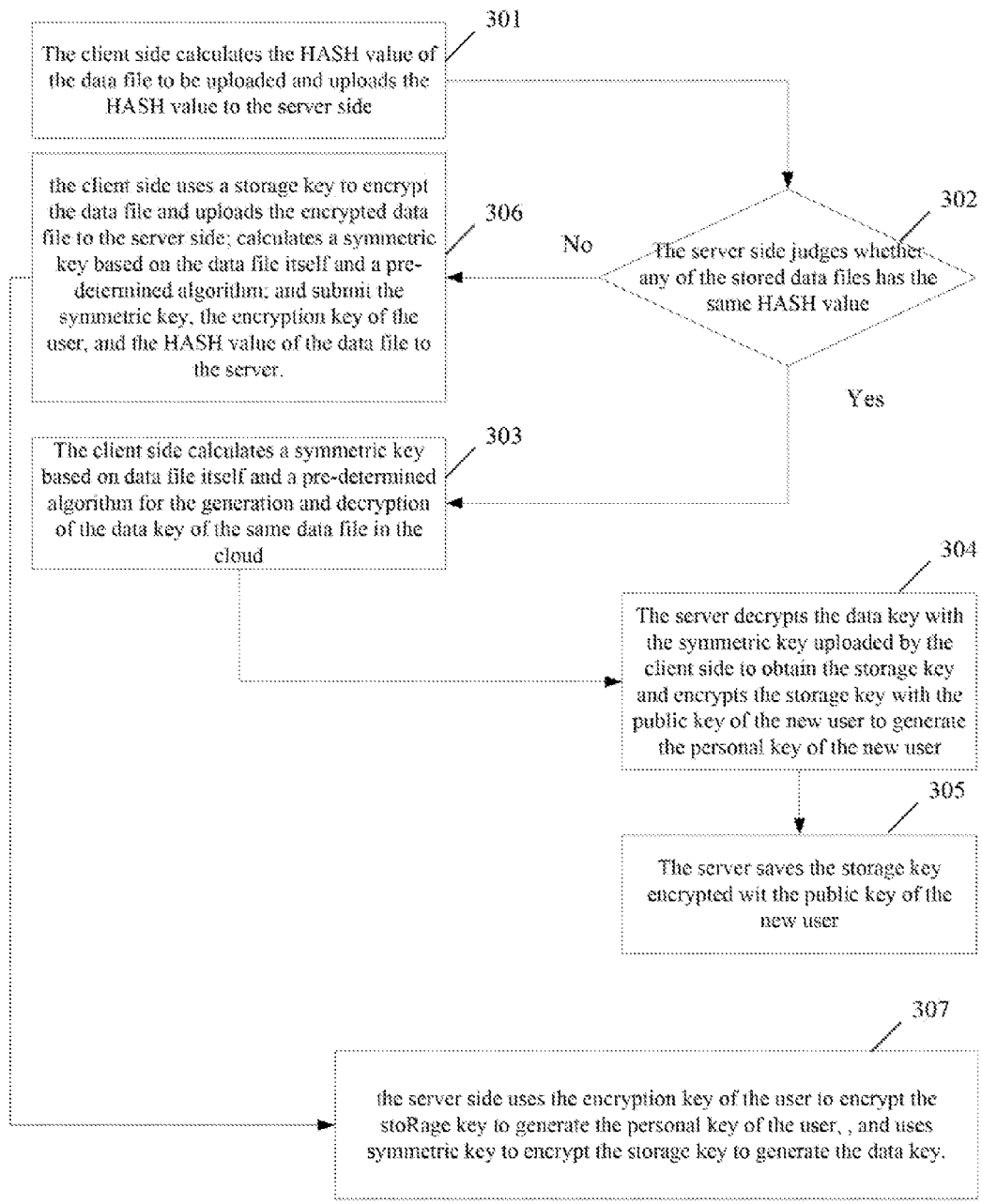
FIG. 3 is yet another flow chart of a storage method provided in the embodiment of the present invention.

FIG. 3 shows a storage method provided in the embodiment of the present invention. In this embodiment, HASH values are utilized to recognize duplicate files; a user's encryption key is used to encrypt the storage key to obtain a personal key for the user, a corresponding decryption key of the user is used to decrypt the personal key to obtain the storage key; wherein, the user's encryption key may be the public key of the user, and corresponding decryption key of the user may be the private key of the user. Meanwhile, a data key is obtained through symmetric encryption of the storage key by using the data itself. As shown in FIG. 2, the procedure mainly includes following steps.

Step 201: before uploading data from a user, the client side of the user calculates the HASH value of the data and submits the HASH value to the server side;

Step 202: the server side judges whether any of stored data in the server has the same HASH value; if yes, execute Step 203; if no, execute Step 206;

Step 203: the server side sends the data key of the data having the same HASH value in the server to the client side;

Step 204: the client side uses the unencrypted data at its own side to decrypt the data key and obtain the storage key, uses the encryption key of the user to encrypt the storage key to generate the personal key of the user and sends the personal key to the server;

Step 205: the server saves the personal key of the user and the client side does not need to actually upload the data to the server. The process will then be terminated.

Step 206: the client side uses a storage key to encrypt the data and submits the encrypted data to the server side.

Step 207: the client side uses the encryption key of the user to encrypt the storage key to generate the personal key of the user, uses the unencrypted data to encrypt the storage key to generate the data key of the data, and then sends the HASH value of the unencrypted data, personal key and data key to the server. The process will then be terminated.

In the future, when the user wants to access the data he/she owns, the personal key is decrypted with the user's decryption key to obtain the storage key, and then the encrypted data is decrypted with the storage key to obtain the unencrypted data.

The technical scheme above ensures that duplicate data will not be stored repeatedly and, furthermore, duplicate data will not be uploaded repeatedly. Meanwhile, only the users who actually have the same unencrypted data can obtain the storage key and access the data. The storage service provider and other users cannot obtain the storage key or unencrypted data, hence, compared to the data security in the prior art, the data security is enhanced.

In one embodiment of this present invention, the client side gets the encrypted data and personal key from the server, decrypts the personal key to obtain the storage key, and decrypts encrypted data with storage key to obtain unencrypted data. This embodiment ensures that the server side can never be aware of unencrypted data or storage keys. In another embodiment, the server decrypts the personal key to obtain the storage key, decrypts encrypted data with the storage key to obtain the unencrypted data, and deletes storage key and the unencrypted data after usage.

Besides the unencrypted data, a key generated from the unencrypted data may also be used to encrypt the storage key to obtain the data key or decrypt the data key to obtain the storage key.

In another embodiment of the present invention, when the server side determines that duplicates of the data to be uploaded exist among the stored data, the server side will inform the client side and the client side will calculate a decryption key used for decrypting the data key to obtain the storage key, based on the data to be uploaded and a pre-determined algorithm, and then send the decryption key for the data key to the server. The server decrypts the data key with the decryption key submitted by the client to obtain the storage key; then a key of the user is used to encrypt the storage key to generate the personal key of the user. FIG. 3 shows a practical example of the embodiment.

FIG. 3 shows a storage method provided in another embodiment of the present invention. In this embodiment, symmetric keys are calculated based on the data to be uploaded and a pre-determined algorithm for encrypting the storage key to obtain the data key or decrypting the data key to obtain the storage key. As shown in FIG. 3, the procedure mainly includes the following steps.

Step 301: before uploading new data, the client side calculates the HASH value of the data to be uploaded and submits the HASH value to the server side;

Step 302: the server side judges whether any of stored data in the server has the same HASH value with the data to be uploaded; if yes, execute Step 303, if no, execute Step 306;

Step 303: the client side calculates a symmetric key based on the data to be uploaded and a pre-determined algorithm. The symmetric key is submitted to the server and will be used for the generation and decryption of the data key;

Step 304: the server decrypts the data key with the symmetric key submitted by the client side to obtain the storage key and encrypts the storage key with the encryption key of the user to generate the personal key of the user;

Step 305: the server saves the personal key of the user and the client side does not need to actually upload the data the process will then be terminated.

Step 306: the client side uses a storage key to encrypt the data and submits the encrypted data to the server side; calculates a symmetric key based on the data to be uploaded and a pre-determined algorithm; and submits the symmetric key, the encryption key of the user, and the HASH value of the data to the server.

Step 307: the server side uses the encryption key of the user to encrypt the storage key to generate the personal key of the user, and uses a symmetric key to encrypt the storage key to generate the data key. The process will then be terminated.

The technical scheme of this embodiment also ensures that duplicate data will not be stored repeatedly and duplicate data will not be uploaded repeatedly. In this embodiment, the storage service provider is able to hold the storage key for a short period, but compared to the prior art in which the storage key is saved on the server side permanently, this embodiment of the present invention provides highly enhanced security.

In an embodiment of the present invention, the symmetric key for the generation and decryption of the data key is calculated by extracting data from specific location in the data, or by calculating the HASH value of the data by using a special HASH algorithm, such as calculating HASH value of the data plus a fixed string.

In another embodiment of the present invention, there is no client on the user side, e.g., a user may upload files through web browser, in which it hard for the user side to calculate the HASH value of data to be uploaded and submits the value to the server side. Therefore, the server needs to obtain the unencrypted data temporarily and then follows the methods shown in the previous embodiments: calculates the HASH value, judges whether duplicate data exist, uses the unencrypted data to decrypt the data key and obtain the storage key, and uses a key from the user to encrypt the storage key to generate a personal key then removes unencrypted data and storage key. Such an approach cannot reduce duplicate uploading, but can reduce duplicate storing copies of same file.

In above embodiments and other embodiments of present invention, the storage key can be a randomly-generated key, to ensure this key is brand-new and no one else knows the key.

In above embodiments, one storage key is used for both encrypting the data to be uploaded and decrypting the encrypted data to obtain unencrypted data. In another embodiment, an encryption key is used to encrypt the data to be uploaded to obtain encrypted data and a decryption key is used to decrypt the encrypted data to obtain unencrypted data, and the two keys are different. In this situation, the data key and the personal key are obtained by encrypting the decryption key.

The key used to encrypt storage key to obtain the data key and/or the key used to decrypt the data key to obtain the storage key is related to the data to be uploaded. In the above embodiments, the key may be the data to be uploaded itself, or the key is calculated based on the data to be uploaded itself and a pre-determined algorithm. Also, in one embodiment, it may be determined by the data to be uploaded itself and other data. For example, the key may be the HASH value of the combination of data to be uploaded itself and data shared by users involved. In general, the key used to decrypt the data key to obtain the storage key cannot easily be figured out without the unencrypted data. In another embodiment, the key used to encrypt the storage key to obtain data key and decrypt the data key to obtain the storage key are different. The encryption/decryption algorithm can be a symmetric one, or an asymmetric one. For example, the symmetric key of FIG. 3 can be replaced by a pair of asymmetric keys.

Any keys in the above embodiments, including keys for encrypting/decrypting data, keys for generating or decrypting the personal key and data key, can be asymmetric public/private keys, or a symmetric key.

In above embodiments and other embodiments of present invention, each encryption or decryption can be implemented by either the server side or the client side, i.e. if one of steps says the server side encrypts/decrypts data (not only means the data to be uploaded, but also includes the storage key or other keys), an alternative embodiment is that client side does the same encryption/decryption, and vice versa. The data flow between the server side and the client side will be adjusted accordingly if necessary. For example, an alternative of step 206 may be "the client side submits the unencrypted data to the server side and the server side uses a storage key to encrypt the data". An alternative of step 303 & 304 may be "Step 303: the client side calculates a symmetric key based on the data to be uploaded and a pre-determined algorithm; Step 304: the client decrypts the data key with the symmetric key calculated to obtain the storage key and encrypts the storage key with the encryption key of the user to generate the personal key of the user, sends personal key to the server." If an embodiment or alternative embodiment includes server encrypting/decrypting data or a storage key, it would be better that the server removes unencrypted data and/or the storage key before the end of the process. The security will be better when all of encryptions/decryptions of data or storage key are implemented on the client side, because the server is unable to obtain unencrypted data.

In an embodiment of present invention, User A has an encryption key ekA and a corresponding decryption key dkA, User B has an encryption key ekB and a corresponding decryption key dkB. When User A uploading data X which has not been stored, the method comprises of:

Step 401: the client at User A's side calculates the data X's HASH value hX and submits the HASH value hX to the server side;

Step 402: the server searches HASH values of all stored data, and determines that there are not any data having the same HASH value with the HASH value hX;

Step 403: the client uses a storage encryption key ekS to encrypt the data X to obtain encrypted data Y, and submits the data Y to the server;

Step 404: the client calculates an encryption key ekX based on the data X and a pre-determined algorithm, uses the key ekX to encrypt the storage decryption key dkS which is the corresponding decryption key of the key ekS, to obtain a data key kX, and submits the key kX to the server;

Step 405: the client uses the key ekA to encrypt the key dkS to obtain User A's personal key kA, and submits the key kA to the server;

Step 406: the server saves the HASH value hX, the data Y, the key kX and the key kA.

In an embodiment of the present invention, step 403 to step 405 may be as follows:

Step 403: the client submits the data X to the server side;
Step 404: the server uses a storage encryption key ekS to encrypt the data X to obtain encrypted data Y, calculates an encryption key ekX based on the data X and a pre-determined algorithm, uses the key ekX to encrypt the storage decryption key dkS which is the corresponding decryption key of the key ekS to obtain data key kX, and uses the key ekA to encrypt the key dkS to obtain User A's personal key kA;

Step 405: the server deletes the data X and the key dkS.

When User B uploading data X which has already been uploaded by user A, the method comprises of:

Step 501: the client at User B's side calculates the data X's HASH value hX and submits HASH value hX to the server;

Step 502; the server searches HASH values of all stored data, finds that here already exists data X with the HASH value hX;

Step 503: the server sends the data X's data key kX to the client side;

Step 504: based on the data X in the client and pre-determined algorithm, the client calculates the decryption key dkX, uses the key dkX to decrypt the key kX to obtain the key dkS, uses User Ws key ekB to encrypt the key dkS to obtain User B's personal key kB, and submits the key kB to the server;

Step 505: the server side saves the key kB.

When User A accessing the data X further, the method comprises of:

Step 601: the server sends the encrypted data Y and User A's personal key kA to the client at User A's side;

Step 602: the client uses User A's decryption key dkA to decrypt the key kA to obtain the key dkS;

Step 603: the client uses the key dkS to decrypt the data Y to obtain unencrypted data X.

In this embodiment, the key ekA and the key dkA may be the same or different, the key ekB and the key dkB may be the same or different, the key ekS and the key dkS may be the same or different, the key ekX and the key dkX may be the same or different. The key eKS and the key dkS can be newly-generated random key.

In one embodiment, the keys ekA, dkA, ekB and dkB may be stored at the client side or the server side. In one embodiment, the ekA and ekB are public keys, stored in both the client side and server side, and dkA and dkB are private keys, stored in the client side.

In another embodiment of the present invention, the storage key ekS is calculated by the data to be uploaded, at this situation, ekX, dkX and kX are not needed, the client of user B calculates ekS based on data to be uploaded.

Figure 4:
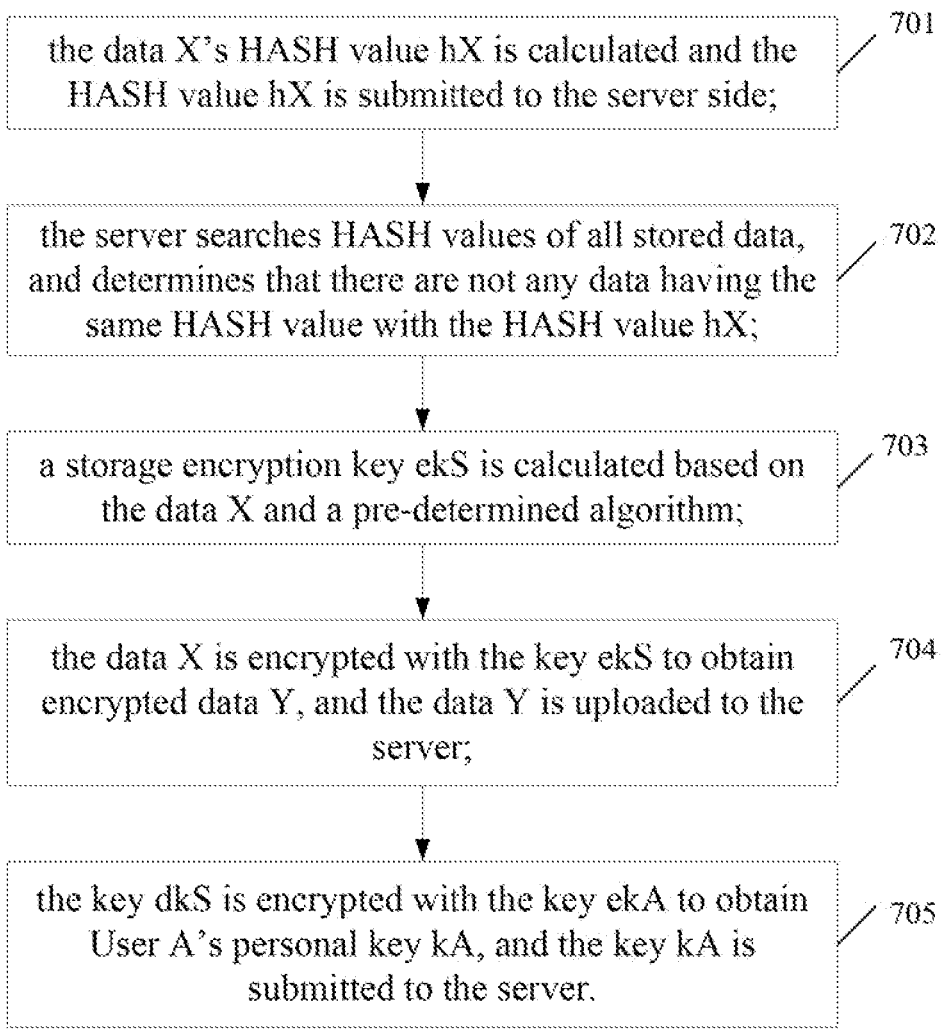
FIG. 4 is another flow chart of a storage method provided in the embodiment of the present invention.

In an embodiment of present invention, User A has an encryption key ekA and a corresponding decryption key dkA, User B has an encryption key ekB and a corresponding decryption key dkB. When User A uploading data X which has not been stored, the method includes following steps as shown in FIG. 4.

Step 701: the client at User A's side calculates the data X's HASH value hX and submits the HASH value hX to the server side;

Step 702: the server searches HASH values of all stored data, and determines that there are not any data having the same HASH value with the HASH value hX;

Step 703: the client calculates a storage encryption key ekS based on the data X and a pre-determined algorithm;

Step 704: the client uses the key ekS to encrypt the data X to obtain encrypted data Y, and submits the data Y to the server;

Step 705: the client uses the key ekA to encrypt the key dkS to obtain User A's personal key kA, and submits the key kA to the server. Wherein, in one embodiment, the key dkS is calculated at the same time with the ekS based on the data X and a pre-determined algorithm.

The server saves the HASH value hX, the data Y, and the key kA.

Figure 5:
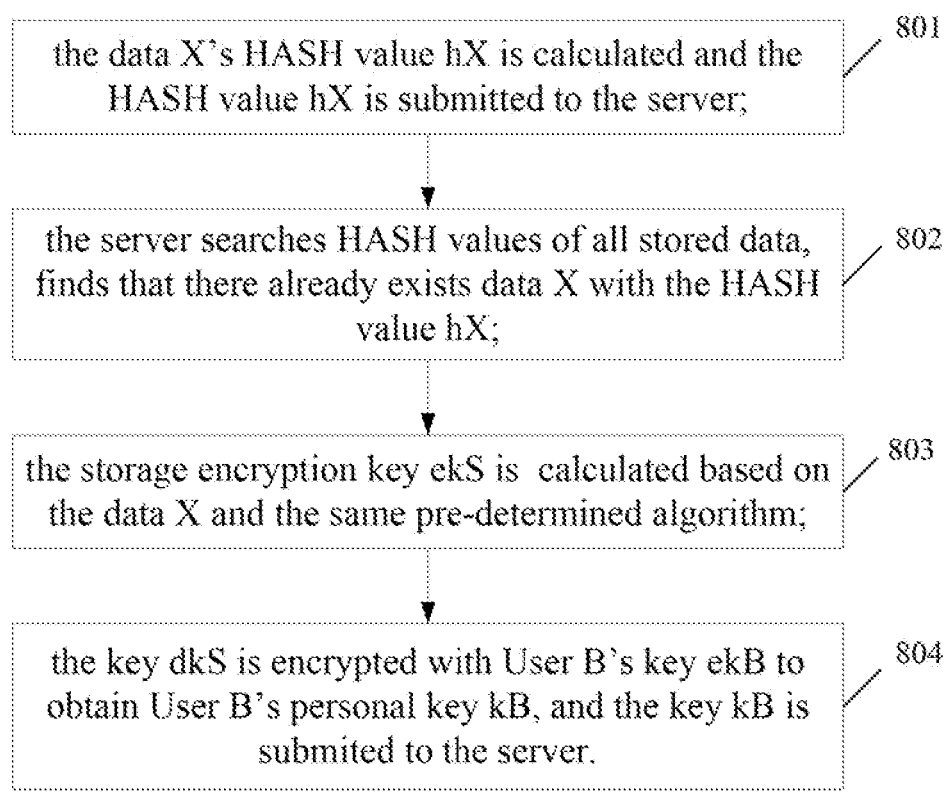
FIG. 5 is another flow chart of a storage method provided in the embodiment of the present invention.

When User B uploading data X which has already been uploaded by user A, the method includes following steps as shown in FIG. 5.

Step 801: the client at User B's side calculates the data X's HASH value hX and submits HASH value hX to the server;

Step 802: the server searches HASH values of all stored data, finds that there already exists data X with the HASH value hX;

Step 803: the client at User B's side calculates the storage encryption key ekS based on the data X and the same pre-determined algorithm; Wherein, in one embodiment, the key dkS is calculated at the same time with the ekS based on the data X and the same pre-determined algorithm.

Step 804: the client at User B's side uses User B's key ekB to encrypt the key dkS to obtain User B's personal key kB, and submits the key kB to the server.

The server side saves the key kB.

Since the data X are usually not random, the pre-determined algorithm used to generate the storage encryption key ekS need have the ability to make the storage encryption key as random as possible (random oracle). In one embodiment, the storage encryption key can by calculated by: calculating the HASH value of the combination of predefined strings and the data X; or can by calculated by: encrypting the data X with a predefined encryption key, and calculating the HASH value of encrypted data.

When User A and User B want to access the data X, they can use dkA and dkB to decrypt kA and kB separately to get the key dkS, and then use dkS to decrypt the data V to get the data X.

Those skilled in the art can understand that the processes implemented by User A's side and User B's side as described above may be implemented by one client, when a user use the one client to upload a document which has not been stored in the server (by the processes implemented by User A's side), and upload a document which has already been stored in the server (by the processes implemented by User B's side). In this situation, the User B and User A may be the same user. In one embodiment, when uploading data X to a server which has not been stored in the server, a storage method includes:

calculating a storage encryption key ekS and the corresponding decryption key dkS based on data X and a pre-determined algorithm;

encrypting the data X with ekS to obtain encrypted data Y, and submitting the data Y to a server;

encrypting dkS with an encryption key ekA to obtain a personal key kA and submitting the kA to the server.

In one embodiment, when uploading data X to a server which has been stored in the server, the method comprises:

calculating a storage encryption key ekS and corresponding decryption key dkS based on the data X and a pre-determined algorithm;

encrypting the key dkS with ekA which is an encryption key to obtain kA, and submitting the key kA to the server.

Wherein the server has already stored data Y which is encrypted data of data X and kB when data Y is firstly submitted by User B, and the data Y and kB are obtained by:

calculating, by a client at User B's side, the storage encryption key ekS and corresponding decryption key dkS based on data X and the same pre-determined algorithm;

encrypting the data X with ekS to obtain encrypted data Y, and submitting the data Y to the server;

encrypting dkS with ekB which is an encryption key for User B to obtain User B's personal key kB and submitting the kB to the server.

The present invention also provides a storage apparatus, which is the server described in the above embodiment, or the client described in the above embodiments.

In an embodiment of present invention, the server side maintains two HASH value list, each item of first HASH value list has a unique corresponding item of second HASH value list. When user B uploads data X to the server, the client at User B's side calculates the HASH value hX of data X using a predefined HASH algorithm haX and submits hX to the server. If the server finds that the first HASH value list has hX, the client will calculate the storage encryption key ekS (for example, calculate ekS based on data X and a predefined algorithm; or, get data key kX from the server, calculate decryption key dkX based on data X, use the key dkX to decrypt the key kX to obtain the key dkS, calculate ekS based on dkS when ekS and dkS are symmetric keys), encrypt data X using key ekS to obtain data Y, calculate the HASH value hY of data Y using a predefined HASH algorithm haY and submit hY to the server. The server will verify whether hY matches the hX's corresponding item of second HASH value list. If matches, the processes in step 102, or steps 203 to 205, or steps 303 to 305, or steps 503 to 505, or steps 803 to 804 are then performed, or, the client will calculate the storage decryption key dkS (for example, calculate dkS based on data X and a predefined algorithm; or, get data key kX from the server, calculate decryption key dkX based on data X, use the key dkX to decrypt the key kX to obtain dkS), encrypt dkS using the encrypting key of user B to obtain kB, and submit kB to the server, the server will store kB; if the hX's corresponding item of second HASH value list is not hY, it indicates that something wrong (unless the rare HASH conflicting), such as a client side has been hacked, it submitted wrong HASH value, or it claimed a data which it doesn't have. One method to fix this issue is the same as uploading new data, i.e. submits data Y to the server, stores data Y in the server, inserts hX in first HASH value list, and stores hY in corresponding item of second HASH value list. It would be better if the related data is marked as questioned for special operation (such as removing questioned data and re-uploading, from the client; or voting among clients which have data whose HASH value is hX, reserving data which gets most votes and removing other questioned data) or special attention (such as manual investigating).

In an embodiment of present invention, the server checks whether the HASH value of data Y using HASH algorithm haY is hY to avoid the situation that correct data cannot be uploaded due to a client submitting wrong data. If not identical, the uploading process will be canceled.

An embodiment of the present invention also provide a security control method of network storage, wherein, a user A has a pair of private key dkA and public key ekA, the method includes:

encrypting, the private key dkA of the user A using the credential of the user A to obtain the first encrypted private key pkA1 and submitting the key pkA1 to a server;

getting, when user A logs in, the key pkA1 from the server, decrypting the key pkA1 using the credential of the user A to obtain the private key dkA of the user A;

encrypting, when user A uploads a data X to the server, data X using a storage encryption key ekS to obtain encrypted data Y, encrypting the decryption key dkS corresponding to the encryption key ekS using the public key ekA of the User A to obtain encrypted decryption key kA, and submitting the data Y and the key kA to the server, and;

getting, when user A downloads the data X from the server, the encrypted data Y and encrypted decryption key kA from the server, decrypting the encrypted decryption key kA using the private key dkA of the user A to obtain the decryption key dkS, decrypting the encrypted data Y using the decryption key dkS to obtain data X.

In one embodiment when user A uploads the data X to the server, the method further includes:

retrieving the keywords from the data X and submitting the keywords to the server;

submitting the search keyword specified by the user A to the server, getting the list of data whose keywords match the search keyword from the server.

In one embodiment, when user A uploads the data X to the server, the method further includes:

converting the data X to a preview format to obtain preview data V, encrypting the data V using a encrypting key ekV to obtain data W, encrypting key dkV which is the corresponding decryption key of ekV using the key ekA to obtain kV, and submitting data W and key kV to the server;

getting, when user A previews the data X, the data W and the key kV from the server, decrypting the key kV using the key dkA to obtain the key dkV, decrypting the data W using the key dkV to obtain the preview data V, using data V for previewing.

In one embodiment, the above process is performed by the client side. In another embodiment, the user credential may be submitted to the server, the server decrypts encrypted private key with the user credential to obtain user's private key, and removes user's private key and user credential later.

When using password as login credential, the whole password is hold by the user, the server stores FLASH value of the password. When the user logs in, the client calculates the HASH value of the password user input, submits to server, the server judges whether the HASH value is same as the value stored in the server to determine login success or not.

The user can set up security question and its answer. User's sensitive data (such as password or private key) is encrypted by the answer and stored in the server. Server stores HASH value of security answer. When a user loses password, the user must answer the security question, the server compares the HASH value of answer input by the user and the HASH value stored in the server to determine whether user correctly answer the security question. If yes, the user's sensitive data can be restored by using the answer to decrypt the encrypted data (decrypting in either client side or server side).

In an embodiment, when calculating HASH value of answer of security question, the equivalent is possible to be applied (such as substituting lower case character with upper case one). If the HASH value of answer input by the user doesn't match the HASH value stored in the server, different equivalents of the answer will be calculated, until HASH value of any of equivalent matches the HASH value stores in the server (success), or all of equivalents fail (fail).

In an embodiment, encrypts user's private key with user's password and stores as first encrypted key, encrypts user's private key with user's answer of security question and stores as second encrypted key. When a user logs in with correct password, the private key will be obtained by decrypting first encrypted key with the password; when a user loses password, the user need answer the security question. If the user correctly answers the security question, user's private key will be obtained by decrypting second encrypted key with the answer. The user can reset the password, a new first encrypted key will be generated by encrypting the password with the new password.

When using PKI private key as login credential, the private key is hold by the user, the server stores its corresponding public key. when user logs in, uses challenge-response authentication. e.g. server generates a random data, submits to client side; the client encrypts this data with user's private key, and returns to the server; the server decrypts the encrypted data with public key, and compare whether it is same as original data. Another embodiment is: server generates a random data, encrypts with user's public key, submits encrypted data to client side; the client decrypts the encrypted data with user's private key, and returns to the server; the server compare whether it is same as original data to determine login success or not.

In an embodiment, the encrypting method of encrypting data A with data B is, calculating an encryption key based on B, encrypting A with the encryption key; the decrypting method of decrypting A with B is, calculating an decryption key based on B, decrypting A with the encryption key. The encryption/decryption key can be a symmetric key, or an asymmetric key. When calculating encryption (or decryption) key based on B, the algorithm need ensure that same value of B will get same result of encryption (or decryption) key. It would be better if the encryption/decryption key has good randomness even though B is not a random input. A possible implementation is: encrypting B with a fixed key, and calculating the HASH value of encrypted data. In an embodiment, when calculating encryption/decryption key based on answer of security question, the security question is a parameter of the algorithm.

By using the technical scheme of the present invention, no one can get user's sensitive data (such as private key, user credential, or password) by all information permanently stored on server.

As discussed above, in one embodiment, any calculation related to unencrypted sensitive data is implemented in client side only; In another embodiment, the server will get user's sensitive data temporarily, but will remove it after usage. At the later situation, the server cannot obtain sensitive data if the user doesn't provide user credential for second time.

Any of those above embodiments can be combined or can be considered separately.

Those skilled in the art know that comparing HASH value makes sense only when using same HASH algorithm. If we don't need comparing two HASH values, these two HASH values are possible to be calculated using different HASH algorithm.

Those skilled in the art know that those storage method, server, and client can be set in one single machine (PC, Server), or distributed system, or system with other structure.

The above embodiments of a storage method, system, server and client are just illustrated examples; any of the features in different embodiments can be reorganized to obtain new embodiments, which are still within the scope of the present invention.

The foregoing are only preferred embodiments of the present invention and is not for use in limiting the protection scope thereof. Any modification, equivalent replacement and improvement made without departing from the spirit and principle of the present invention should be included within the protection scope thereof.

The invention claimed is:

1. A security control method of network storage, wherein, user A has a pair of private key dkA and public key ekA, the method comprises:
   encrypting, the private key dkA of the user A using the credential of the user A to obtain the first encrypted private key pkA1 and submitting the key pkA1 to a server;
   getting, when user A logs in, the key pkA1 from the server, decrypting the key pkA1 using the credential of the user A to obtain the private key dkA of the user A;
   encrypting, when user A uploads a data X to the server, data X using a storage encryption key ekS to obtain encrypted data Y, encrypting the decryption key dkS corresponding to the encryption key ekS using the public key ekA of the User A to obtain encrypted decryption key kA, and submitting the data Y and the key kA to the server, and;
   getting, when user A downloads the data X from the server, the encrypted data Y and encrypted decryption key kA from the server, decrypting the encrypted decryption key kA using the private key dkA of the user A to obtain the decryption key dkS, decrypting the encrypted data Y using the decryption key dkS to obtain data X;
   wherein, the method further comprises:
   encrypting the private key dkA of the user A using the answer of a security question of the user A to obtain second encrypted private key pkA2, and submitting the key pkA2 to the server;
   when the user forgets the user credential, further comprising:
   getting the second encrypted private key pkA2 from the server, decrypting key pkA2 using the answer inputted by user A for the security question to obtain the private key dkA of the user A, encrypting the key dkA using a new user credential to obtain new first encrypted private key pkA1' and submitting the key pkA1' to the server;
   wherein, the method further comprises:
   calculating the HASH value hS1 of the answer of the security question using a predefined HASH algorithm haS and submitting hS1 to the server;
   when the user A answers the security question, further comprising:
   calculating the HASH value hS2 of the answer inputted by the user A using HASH algorithm haS;
   submitting hS2 to the server;
   getting the comparing result of whether hS2 is equal to hS1 from the server;
   if comparing result is different, further comprising:
   changing the case status of at least one character of the answer inputted by the user A,
   calculating the HASH value hS3 of the changed answer using the HASH algorithm haS;
   submitting hS3 to the server, getting the comparing result of whether hS3 is equal to hS1 from the server.

2. A method of claim 1, further comprising:
   encrypting the credential of the user A using the answer of a security question of the user A to obtain second encrypted private key pkA2, and submitting the key pkA2 to the server;
   when the user A forgets the user credential, further comprising:
   getting the second encrypted private key pkA2 from the server, decrypting key pkA2 using the answer inputted by user A for the security question to obtain the credential of the user A.

3. A method of claim 1, wherein the user credential comprises password, and the method further comprises:
   calculating the HASH value hP1 of the password using a predefined HASH algorithm haP and submitting hP1 to the server;
   when the user A logs in, further comprising:
   calculating HASH value hP2 of password inputted by the user A using the HASH algorithm haP, submitting hP2 to the server, and getting the comparing result of whether hP2 is equal to hP1 to determine whether login success.

4. A method of claim 1, wherein, the user A has second pair of public key ukA and private key rkA;
   when the user A logs in, further comprising:
   logging in with the private key rkA by challenge-response authentication.

5. A method of claim 4, wherein ukA is equal to ekA, and rkA is equal to dkA.

6. A method of claim 1, when user B who has a pair of public key ekB and private key dkB uploads the same data X to the server, further comprising:
   calculating dkS, encrypting dkS using key ekB to obtain kB, submitting kB to the server.

7. A method of claim 6, when user A uploads the data X to the server, further comprising:
   encrypting dkS with an encryption key ekX related to X to obtain key kX of data X, and submitting kX to the server;
   when user B uploads data X to the server, the method further comprises:
   calculating dkX which is the corresponding decryption key of ekX based on X;
   decrypting kX using key dkX to obtain key dkS.

8. A method of claim 6, when user B uploads the data X to the server, further comprising:
   calculating the HASH value hX of the data X using a predefined HASH algorithm haX;
   submitting hX to the server;

getting the result of comparing hX with the HASH values of existing data on server side to determine whether X is same with any of the stored data.

9. A method of claim 8, when user A uploads the data X to the server, further comprising:
  calculating the HASH value hY of the data Y using a predefined HASH algorithm haY;
  submitting hY to the server;
  when user B uploads the same data X to the server, further comprising:
  calculating the storage encryption key ekS;
  encrypting the data X using the key ekS to obtain the encrypted data Y;
  calculating the HASH value hY of the data Y using the HASH algorithm haY;
  submitting hY to the server;
  getting the server's verifying result of whether hY matches the HASH value of the encrypted data corresponding to the data whose HASH value is hX.

10. A method of claim 9, when user B uploads the same data X to the server, further comprising:
  submitting, if the server's verifying result is mismatched, the data Y to the server as if the data X is a new data to the server.

11. A method of claim 9, when user B uploads the same data X to the server, further comprising:
  marking, if the server's verifying result is mismatched, the data whose recorded HASH value is hX as questioned.

12. A method of claim 6, when user A uploads the data X to the server, further comprising:
  calculating ekS based on the data X and a predefined algorithm;
  when user B uploads the same data X to the server, further comprising:
  calculating dkS based on the data X and a predefined algorithm.

13. A method of claim 1, when user A uploads the data X to the server, further comprising:
  submitting hY to the server;
  uploading process being failed if hY is different than the HASH value of the data Y using a predefined HASH algorithm haY.

14. A method of claim 1, when user A uploads the data X to the server, further comprising:
  generating a random storage encryption key ekS and corresponding decryption key dkS.

15. A method of claim 1, wherein the key ekS and dkS are symmetric keys.

16. A method of claim 1, when user A uploads the data X to the server, further comprising:
  retrieving the keywords from the data X and submitting the keywords to the server;
  submitting the search keyword specified by the user A to the server, getting the list of data whose keywords match the search keyword from the server.

17. A method of claim 1, when user A uploads the data X to the server, further comprising:
  converting the data X to a preview format to obtain preview data V, encrypting the data V using a encrypting key ekV to obtain data W, encrypting key dkV which is the corresponding decryption key of ekV using the key ekA to obtain kV, and submitting data W and key kV to the server;
  getting, when user A previews the data X, the data W and the key kV from the server, decrypting the key kV using the key dkA to obtain the key dkV, decrypting the data W using the key dkV to obtain the preview data V, using data V for previewing.

* * * * *